United States Patent
Tamatani et al.

(10) Patent No.: US 11,875,950 B2
(45) Date of Patent: Jan. 16, 2024

(54) ELECTROLYTIC CAPACITOR

(71) Applicant: Murata Manufacturing Co., Ltd., Nagaokakyo (JP)

(72) Inventors: Yasuhiro Tamatani, Nagaokakyo (JP); Kazuya Kusuda, Nagaokakyo (JP); Kazutoyo Horio, Nagaokakyo (JP); Takeshi Furukawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/653,189

(22) Filed: Mar. 2, 2022

(65) Prior Publication Data
US 2022/0189703 A1 Jun. 16, 2022

Related U.S. Application Data

(63) Continuation of application No. 16/726,376, filed on Dec. 24, 2019, now Pat. No. 11,295,900.

(30) Foreign Application Priority Data

Dec. 26, 2018 (JP) .................................. 2018-242734
Nov. 19, 2019 (JP) .................................. 2019-208813

(51) Int. Cl.
*H01G 9/00* (2006.01)
*H01G 9/012* (2006.01)
(Continued)

(52) U.S. Cl.
CPC ........... *H01G 9/0029* (2013.01); *H01G 9/012* (2013.01); *H01G 9/025* (2013.01); *H01G 9/045* (2013.01);
(Continued)

(58) Field of Classification Search
None
See application file for complete search history.

(56) References Cited

U.S. PATENT DOCUMENTS 3,889,357 A * 6/1975 Millard ................ H01G 9/0029
29/25.03
5,384,685 A * 1/1995 Tong ................... H01M 4/0419
29/25.03
(Continued)

FOREIGN PATENT DOCUMENTS

CN 1329746 A * 1/2002 ........... H01G 9/0029
CN 104465084 A * 3/2015 ............. H01G 4/232
(Continued)

*Primary Examiner* — Scott B Geyer
(74) *Attorney, Agent, or Firm* — ArentFox Schiff LLP

(57) ABSTRACT

An electrolytic capacitor that includes a resin molded body having opposed first and second end surfaces, the body including a stack that includes a capacitor element with an anode exposed at the first end surface, a dielectric layer on a surface of the anode, and a cathode opposite to the anode and exposed at the second end surface, and a sealing resin that encloses the stack; a first external electrode on the first end surface of the resin molded body and electrically connected to the anode; and a second external electrode on a second end surface of the resin molded body and electrically connected to the cathode, wherein the first external electrode and the second external electrode each include a resin electrode layer containing a conductive component and a resin component.

1 Claim, 6 Drawing Sheets

Cross-sectional view taken along line A-A

(51) Int. Cl.
*H01G 9/025* (2006.01)
*H01G 9/048* (2006.01)
*H01G 9/07* (2006.01)
*H01G 9/045* (2006.01)
*H01G 9/15* (2006.01)

(52) U.S. Cl.
CPC .............. *H01G 9/048* (2013.01); *H01G 9/07* (2013.01); *H01G 9/15* (2013.01)

(56) References Cited

U.S. PATENT DOCUMENTS

| | | | |
|---|---|---|---|
| 5,450,279 A * | 9/1995 | Yoshida | H01G 11/52 |
| | | | 361/522 |
| 6,212,061 B1 * | 4/2001 | Irwin | H01G 11/80 |
| | | | 361/517 |
| 6,346,127 B1 | 2/2002 | Kuriyama | |
| 9,691,546 B2 * | 6/2017 | Takaoka | H01G 4/248 |
| 11,227,725 B2 * | 1/2022 | Kumakawa | H01G 9/07 |
| 2002/0001169 A1 | 1/2002 | Shiraishi et al. | |
| 2003/0026064 A1 | 2/2003 | Nakada et al. | |
| 2003/0184955 A1 | 10/2003 | Matsumoto et al. | |
| 2004/0125543 A1 | 7/2004 | Hirano et al. | |
| 2006/0120023 A1 | 6/2006 | Kobayashi et al. | |
| 2009/0201631 A1 * | 8/2009 | Kasuga | H01G 9/12 |
| | | | 361/534 |
| 2011/0026192 A1 | 2/2011 | Rezai-Kalantary | |
| 2011/0261503 A1 | 10/2011 | Aoyama | |
| 2012/0182668 A1 | 7/2012 | Kim et al. | |
| 2012/0300361 A1 | 11/2012 | Togashi | |
| 2014/0134487 A1 * | 5/2014 | Itaya | H01M 10/058 |
| | | | 29/25.03 |
| 2015/0270070 A1 | 9/2015 | Shin et al. | |
| 2016/0071654 A1 * | 3/2016 | Kimura | H01G 9/14 |
| | | | 156/60 |
| 2017/0076872 A1 * | 3/2017 | Arakawa | H01G 9/0032 |
| 2017/0140877 A1 | 5/2017 | Kuromi | |
| 2017/0250026 A1 | 8/2017 | Mizuno | |
| 2017/0365419 A1 * | 12/2017 | Demizu | H01G 9/15 |
| 2018/0025845 A1 | 1/2018 | Sato et al. | |
| 2019/0013150 A1 * | 1/2019 | Koo | H01G 4/2325 |
| 2019/0122827 A1 | 4/2019 | Furukawa et al. | |
| 2019/0148070 A1 * | 5/2019 | Kobayashi | H01G 4/232 |
| | | | 174/260 |
| 2019/0237266 A1 * | 8/2019 | Tsutsumi | H01G 9/10 |
| 2019/0244765 A1 * | 8/2019 | Harada | H01G 9/045 |
| 2019/0362895 A1 * | 11/2019 | Kobayashi | H01G 4/2325 |
| 2020/0115275 A1 * | 4/2020 | Awagakubo | H01B 1/22 |
| 2020/0194187 A1 * | 6/2020 | Kumakawa | H01G 9/012 |
| 2021/0125783 A1 | 4/2021 | Onodera et al. | |

FOREIGN PATENT DOCUMENTS

| | | | | |
|---|---|---|---|---|
| CN | 106887332 B | * | 5/2019 | ............. H01G 4/008 |
| JP | 2012004480 A | | 1/2012 | |
| JP | 2014203862 A | | 10/2014 | |
| JP | 2017152620 A | | 8/2017 | |
| JP | 2018056543 A | * | 4/2018 | ............. H01G 11/00 |
| JP | 2019079866 A | | 5/2019 | |
| WO | WO-2014188833 A1 | * | 11/2014 | .......... H01G 9/0036 |
| WO | 2018056319 A1 | | 3/2018 | |

* cited by examiner

Cross-sectional view taken along line A-A

ELECTROLYTIC CAPACITOR

CROSS REFERENCE TO RELATED APPLICATIONS

The present application is a continuation of application Ser. No. 16/726,376, filed Dec. 24, 2019, which claims priority to Japanese Patent Application No. 2018-242734, filed Dec. 26, 2018, and Japanese Patent Application No. 2019-208813, filed Nov. 19, 2019, the entire contents of each of which are incorporated herein by reference.

FIELD OF THE INVENTION

The present invention relates to an electrolytic capacitor.

BACKGROUND OF THE INVENTION

Patent Literature 1 discloses a multilayer ceramic capacitor.

This multilayer ceramic capacitor is produced by dipping a first surface and a second surface of a capacitor body in an electrode paste, drying and baking the electrode paste to form a first base film for an external electrode, printing the electrode paste on both end portions of a fifth surface of the capacitor body in the length direction, drying and baking the electrode paste to form a second base film for an external electrode to be continuous with the first base film.

Patent Literature 2 discloses a method of forming an external electrode on a ceramic capacitor. Specifically, the method includes a first paste layer forming step of performing screen printing on an end surface of a body and a second paste layer forming step of performing screen printing on a main surface of the body, wherein the first paste layer forming step is followed by a first baking step, and the second paste layer forming step is followed by a second baking step.

Patent Literature 1: JP 2017-152620 A
Patent Literature 2: JP 2012-4480 A

SUMMARY OF THE INVENTION

According to the techniques disclosed in Patent Literatures 1 and 2, an electrode paste is screen printed on a ceramic body, and subsequently, baking is performed at a high temperature of 600° C. to 800° C. The electrode paste composition, rheology, printing conditions, and the like are suitable for the baking.

An electrolytic capacitor such as a solid electrolytic capacitor may have a configuration in which a stack including a capacitor element with an anode having a dielectric layer on its surface and a cathode opposite to the anode is enclosed in a resin molded body, and an external electrode is formed on the resin molded body.

When forming an external electrode on the resin molded body, an electrode layer cannot be formed by baking or the like at a high temperature, so that it is difficult to improve adhesion between the resin molded body and the electrode layer. Thus, the external electrode formation methods disclosed in Patent Literature 1 and 2 cannot be used directly.

In addition, when performing a heat treatment at a temperature of 150° C. to 260° C. during drying in the manufacturing process or during reflow for soldering, thermal stress is generated due to the difference in linear expansion coefficient between the resin molded body and the electrode layer, which makes the electrode layer easily separable from the resin molded body.

Thus, the present invention aims to provide an electrolytic capacitor including an external electrode having good adhesion to a resin molded body.

The present invention provides an electrolytic capacitor that includes: a resin molded body having opposed first and second end surfaces, the body including a stack that includes a capacitor element with an anode exposed at the first end surface, a dielectric layer on a surface of the anode, and a cathode opposite to the anode and exposed at the second end surface, and a sealing resin that encloses the stack; a first external electrode on a first end surface of the resin molded body and electrically connected to the anode; and a second external electrode on a second end surface of the resin molded body and electrically connected to the cathode, wherein the first external electrode and the second external electrode each include a resin electrode layer containing a conductive component and a resin component.

The present invention provides an electrolytic capacitor including an external electrode having good adhesion to a resin molded body.

DETAILED DESCRIPTION OF THE PREFERRED EMBODIMENTS

An electrolytic capacitor of the present invention is described below.

The present invention is not limited to the following preferred embodiments, and may be suitably modified without departing from the gist of the present invention. Combinations of two or more preferred features described in the following preferred embodiments are also within the scope of the present invention.

First, an electrolytic capacitor according to the first embodiment of the present invention is described.

Figure 1:
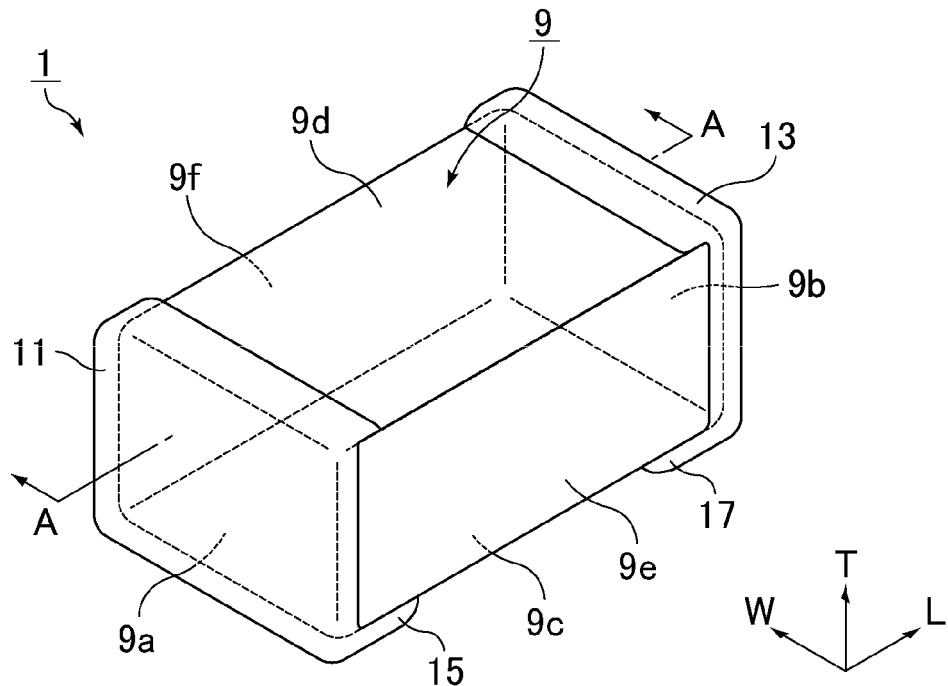
FIG. 1 is a schematic perspective view of an example of an electrolytic capacitor of a first embodiment.

FIG. 1 is a schematic perspective view of an example of the electrolytic capacitor of the first embodiment. FIG. 1 shows a rectangular parallelepiped resin molded body 9 defining an electrolytic capacitor 1. The resin molded body 9 has a length direction (L direction), a width direction (W direction), and a thickness direction (T direction), and includes a first end surface 9a and a second end surface 9b which are opposite to each other in the length direction. A first external electrode 11 is formed on the first end surface 9a, and a second external electrode 13 is formed on the second end surface 9b. The resin molded body 9 includes a bottom 9c and a top 9d which are opposite to each other in the thickness direction. The bottom 9c is a surface on the side that serves as a mounting surface of the electrolytic capacitor 1.

A third external electrode 15 and a fourth external electrode 17 are formed on the bottom 9c. The third external electrode 15 is electrically connected to the first external electrode 11 and the fourth external electrode 17 is electrically connected to the second external electrode 13.

The resin molded body 9 also includes a first lateral surface 9e and a second lateral surface 9f which are opposite to each other in the width direction W.

Herein, a plane along the length direction (L direction) and the thickness direction (T direction) of the electrolytic capacitor or the resin molded body is referred to as an "LT plane", a plane along the length direction (L direction) and the width direction (W direction) is referred to as an "LW plane", and a plane along the thickness direction (T direction) and the width direction (W direction) is referred to as a "WT plane".

Figure 2:
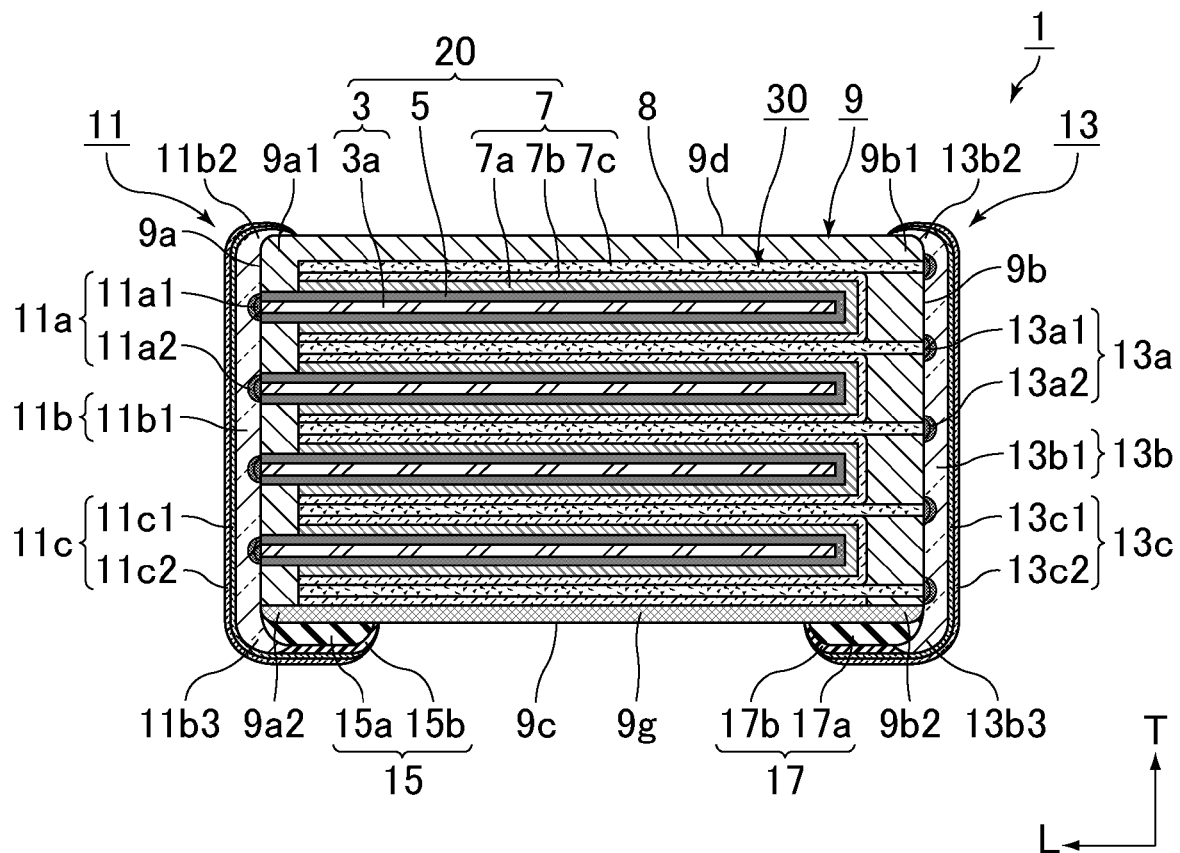
FIG. 2 is a cross-sectional view taken along the line A-A of the electrolytic capacitor shown in FIG. 1.

FIG. 2 is a cross-sectional view taken along the line A-A of the electrolytic capacitor shown in FIG. 1.

FIG. 2 shows a capacitor element 20 that includes an anode 3 with a dielectric layer 5 on its surface and a cathode 7 opposite to the anode 3. Multiple such capacitor elements 20 are stacked to form a stack 30, and the stack 30 is enclosed in a sealing resin 8, wherein the resin molded body 9 is obtained. In the stack 30, the capacitor elements 20 may be bonded to each other via a conductive adhesive (not shown).

The first external electrode 11 is formed on the first end surface 9a of the resin molded body 9, and the first external electrode 11 is electrically connected to the anode 3 exposed at the first end surface 9a. The second external electrode 13 is formed on the second end surface 9b of the resin molded body 9, and the second external electrode 13 is electrically connected to the cathode 7 exposed at the second end surface 9b.

The anode 3 of the capacitor element 20 includes valve-action metal foil 3a in the center and a porous layer such as an etched layer (not shown) on the surface. The dielectric layer 5 is disposed on the surface of the porous layer.

Examples of the valve-action metal include elemental metals such as aluminum, tantalum, niobium, titanium, zirconium, magnesium, silicon, and alloys containing these metals. Of these, aluminum and an aluminum alloy are preferred.

The valve-action metal may have any shape, but it is preferably flat, and is more preferably formed in foil. The porous layer is preferably an etched layer that has been etched with hydrochloric acid or the like.

The thickness of the valve-action metal foil before etching is preferably 60 μm to 180 μm. The thickness of the non-etched valve-action metal foil (core) after etching is preferably 10 μm to 70 μm. The thickness of the porous layer is designed according to the withstand voltage and capacitance required for the electrolytic capacitor, but the thickness of the porous layer including the porous layers on both sides of the valve-action metal foil is preferably 10 μm to 120 μm.

The anode 3 is led out to the first end surface 9a of the resin molded body 9 and electrically connected to the first external electrode 11.

The dielectric layer is preferably formed of an oxide film of the valve-action metal. For example, when aluminum foil is used as a valve-action metal substrate, the aluminum foil is anodized in an aqueous solution containing boric acid, phosphoric acid, adipic acid, a sodium salt or an ammonium salt thereof, or the like, whereby an oxide film that serves as a dielectric layer can be formed.

The dielectric layer is formed along the surface of the porous layer, whereby pores (recesses) are formed in the dielectric layer. The thickness of the dielectric layer is designed according to the withstand voltage and capacitance required for the electrolytic capacitor, but the thickness of the dielectric layer is preferably 10 nm to 100 nm.

The cathode 7 of the capacitor element 20 is a stack including a solid electrolyte layer 7a formed on the dielectric layer 5, a conductive layer 7b formed on the solid electrolyte layer 7a, and a cathode lead-out layer 7c formed on the conductive layer 7b.

The electrolytic capacitor of the present embodiment including a solid electrolyte layer as part of the cathode is considered to be a solid electrolytic capacitor. Examples of materials defining the solid electrolyte layer include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with a dopant (poly(styrene sulfonate) (PSS)).

The solid electrolyte layer is formed by, for example, a method in which a polymerized film of poly(3,4-ethylenedioxythiophene) or the like is formed on the surface of the dielectric layer using a treatment liquid containing a monomer such as 3,4-ethylenedioxythiophene or a method in which a dispersion of a polymer such as poly(3,4-ethylenedioxythiophene) is applied to the surface of the dielectric layer and dried. Formation of the solid electrolyte layer for an inner layer for filling the pores (recesses) is preferably followed by formation of a solid electrolyte layer for an outer layer for covering the entire dielectric layer.

The solid electrolyte layer can be formed in a predetermined region by applying the treatment liquid or dispersion to the dielectric layer by, for example, sponge transfer, screen printing, spray coating, inkjet printing, or using a dispenser. The thickness of the solid electrolyte layer is preferably 2 μm to 20 μm.

The conductive layer is disposed to electrically and mechanically connect the solid electrolyte layer to the cathode lead-out layer. For example, the conductive layer is preferably a carbon layer, a graphene layer, or a silver layer formed by applying a conductive paste such as a carbon paste, a graphene paste, or a silver paste. The conductive layer may be a composite layer in which a silver layer is disposed on a carbon layer or a graphene layer, or a mixed layer containing a mixture of a carbon paste or a graphene paste with a silver paste.

The conductive layer can be formed on the solid electrolyte layer by applying a conductive paste such as a carbon paste by, for example, sponge transfer, screen printing, spray coating, inkjet printing, or using a dispenser. Preferably, a cathode lead-out layer formed in the subsequent step is stacked while the conductive layer is viscous before drying. The thickness of the conductive layer is preferably 2 μm to 20 μm.

The cathode lead-out layer can be formed from metal foil or a printed electrode layer. In the case of the metal foil, the metal foil preferably contains at least one metal selected from the group consisting of Al, Cu, Ag, and an alloy mainly containing any of these metals. When the metal foil contains any of these metals, the metal foil can have a lower resistance value, and ESR can be reduced. Alternatively, the metal foil may be one whose surface is coated with carbon or titanium by a film forming method such as sputtering or vapor deposition. Use of carbon-coated Al foil is more preferred. The thickness of the metal foil is not limited, but it is preferably 20 µm to 50 µm, in view of better handling during production, smaller size, and lower ESR.

In the case of the printed electrode layer, the cathode lead-out layer can be formed in a predetermined region by applying an electrode paste to the conductive layer by, for example, sponge transfer, screen printing, spray coating, inkjet printing, or using a dispenser. The electrode paste is preferably one mainly containing Ag, Cu, or Ni. When the cathode lead-out layer is a printed electrode layer, the printed electrode layer can made thinner than the cathode lead-out layer formed from metal foil. In the case of screen printing, the printed electrode layer can have a thickness of 2 µm to 20 µm.

The cathode lead-out layer 7c is led out to the second end surface 9b of the resin molded body 9 and electrically connected to the second external electrode 13.

The sealing resin 8 defining the resin molded body 9 at least contains a resin, and preferably contains a resin and a filler. Examples of the resin preferably include epoxy resins, phenol resins, polyimide resins, silicone resins, polyamide resins, and liquid crystal polymers. The sealing resin 8 can be used in the form of either a solid resin or a liquid resin. Examples of the filler preferably include silica particles, alumina particles, and metal particles. Use of a material obtained by adding silica particles to a solid epoxy resin and a phenol resin is more preferred.

When a solid sealing material is used, the resin molded body is preferably formed by a method that uses a resin mold such as a compression mold or a transfer mold, with a compression mold being more preferably used. When a liquid sealing material is used, the resin molded body is preferably formed by a method that uses a dispenser or printing. Preferably, a compression mold is used to enclose the stack 30 of the capacitor elements 20 each including the anode 3, the dielectric layer 5, and the cathode 7 in the sealing resin 8 to produce the resin molded body 9.

The resin molded body 9 has a rectangular parallelepiped shape, and includes the top 9d and the bottom 9c as the LW planes, the first lateral surface 9e and the second lateral surface 9f as the LT planes, and the first end surface 9a and the second end surface 9b as the WT planes.

The resin molded body 9 includes a support substrate 9g on its bottom, and the bottom surface of the support substrate 9g is the bottom 9c of the resin molded body 9. The support substrate is disposed to integrate a stack of multiple capacitor elements, and is preferably made of a glass epoxy substrate.

Preferably, Cu patterned electrode layers 15a and 17a which respectively turn into the third external electrode 15 and the fourth external electrode 17 are formed on the bottom 9c of the resin molded body 9.

In the resin molded body 9, top corner portions 9a1 and 9b1 and bottom corner portions 9a2 and 9b2 are rounded to have an R (curvature radius) by barrel polishing after molded in a resin mold. A resin molded body is softer than a ceramic body and it is thus difficult to round each corner to have an R by barrel polishing. Yet, each corner can be rounded to have a small curvature radius R by adjusting the composition, particle size, and shape of a medium, treatment time in a barrel, and the like. Due to the difference in hardness between the sealing resin 8 and the support substrate 9g (sealing resin <support substrate), the top corner portions 9a1 and 9b1 each have an R (curvature radius) greater than the R (curvature radius) of each of the bottom corner portions 9a2 and 9b2.

Such a configuration can also improve bondability of the first external electrode and the second external electrode formed on the end surfaces of the resin molded body with the third external electrode and the fourth external electrode formed on the bottom of the resin molded body, respectively.

In the resin molded body defining the electrolytic capacitor, preferably, the anode exposed at the first end surface of the resin molded body and/or the cathode exposed at the second end surface of the resin molded body are/is exposed such that the anode and/or cathode of one capacitor element are/is divided into multiple anode portions and/or cathode portions and exposed. In this case, the adhesion between the resin molded body and the resin electrode layer improves as compared to the case where the anode and/or cathode of one capacitor element are/is exposed linearly and continuously.

Figure 3:
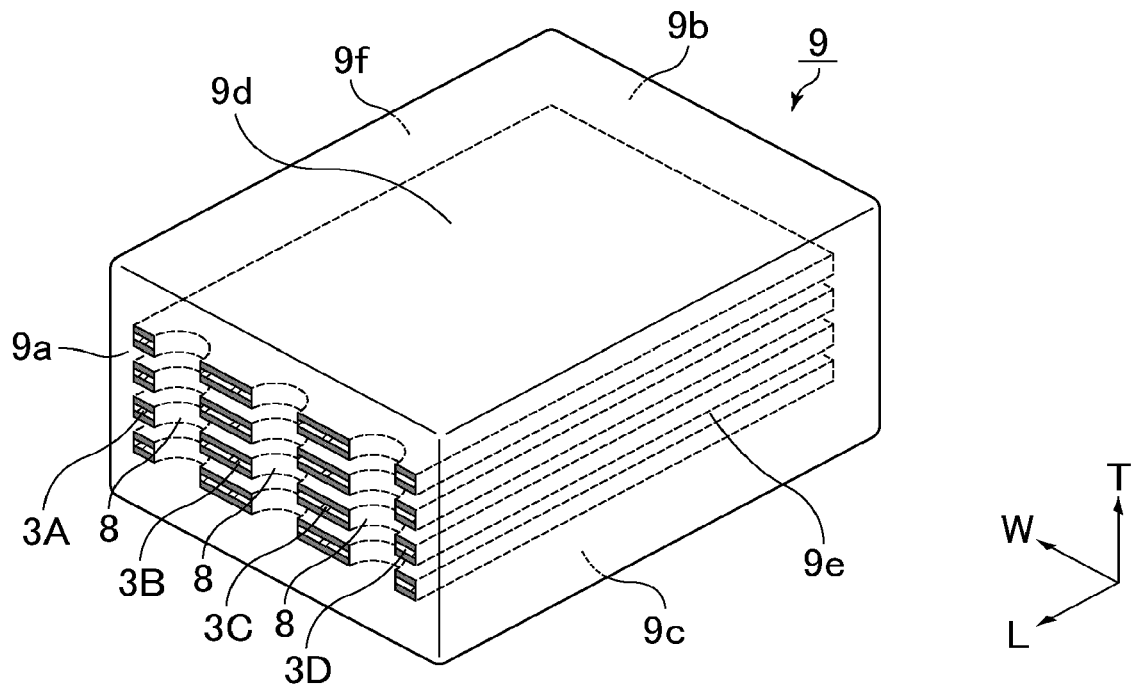
FIG. 3 is a perspective view of a resin molded body in which a first end surface is exposed.
Figure 4:
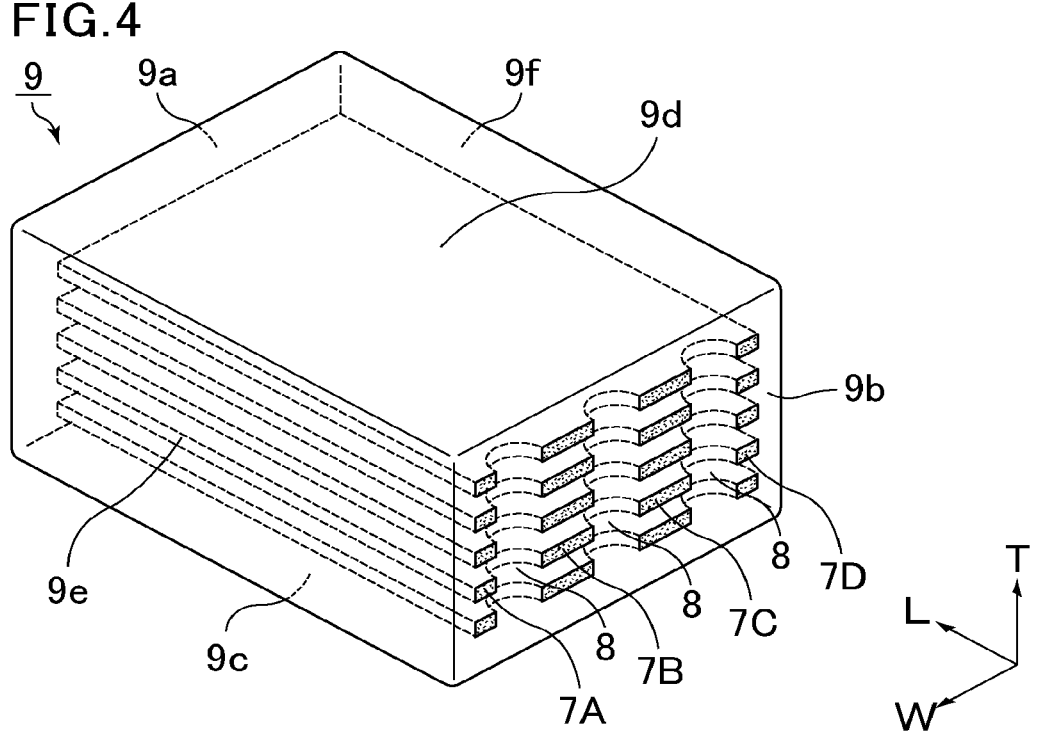
FIG. 4 is a perspective view of a resin molded body in which a second end surface is exposed.

FIG. 3 is a perspective view of the resin molded body in which the first end surface 9a is exposed. FIG. 4 is a perspective view of the resin molded body in which the second end surface 9b is exposed.

The anode 3 is exposed at the first end surface 9a of the resin molded body 9 shown in FIG. 3. The anode of one capacitor element is divided into four portions and exposed. These exposed portions of the anode are indicated as an anode portion 3A, an anode portion 3B, an anode portion 3C, and an anode portion 3D. The sealing resin 8 fills between each anode portion.

The cathode 7 is exposed at the second end surface 9b of the resin molded body 9 shown in FIG. 4. The cathode of one capacitor element is divided into four portions and exposed. These exposed portions of the cathode are indicated as a cathode portion 7A, a cathode portion 7B, a cathode portion 7C, and a cathode portion 7D. The sealing resin 8 fills between each cathode portion.

A detailed description is given below on the configurations of the external electrodes included in the electrolytic capacitor of the first embodiment of the present invention. The first external electrode and the second external electrode of the electrolytic capacitor of the present invention are not limited as long as they are external electrodes each including a resin electrode layer containing a conductive component and a resin component, and they may not include any other plating layers. Yet, the following description is given on the first external electrode and the second external electrode each including an inner plating layer, a resin electrode layer, and an outer plating layer with reference to FIG. 2.

The resin electrode layer shown in FIG. 2 is a printed resin electrode layer formed by screen printing of an electrode paste.

FIG. 2 shows layer structures of the first external electrode 11 and the second external electrode 13 included in the electrolytic capacitor 1.

The first external electrode 11 includes an inner plating layer 11a, a resin electrode layer 11b, and an outer plating layer 11c. The inner plating layer 11a includes a Ni plating layer 11a1 and a Ag plating layer 11a2. The outer plating layer 11c includes a Ni plating layer 11c1 and a Sn plating layer 11c2. The resin electrode layer 11b includes a Ag printed resin electrode layer 11b1.

The second external electrode 13 includes an inner plating layer 13a, a resin electrode layer 13b, and an outer plating layer 13c. The inner plating layer 13a includes a Ni plating layer 13a1 and a Ag plating layer 13a2. The outer plating layer 13c includes a Ni plating layer 13c1 and a Sn plating layer 13c2. The resin electrode layer 13b includes a Ag printed resin electrode layer 13b1.

Preferably, the Ni plating layers 11a1 and 13a1 of the inner plating layers 11a and 13a, respectively, are formed by a zincate treatment. In other words, the surface of aluminum foil of the anode 3 exposed at the first end surface of the resin molded body 9 is alkaline etched to remove an oxide film of the anode 3, and Zn plating is then performed. The zincate treatment preferably includes both single zincate (alkaline cleaning) and double zincate (removing). The zincate treatment may be performed by acid etching. Subsequently, electroless Ni plating is performed as displacement plating, whereby the Ni plating layers 11$a$1 and 13$a$1 are formed.

The Ag plating layers 11$a$2 and 13$a$2 of the inner plating layers are formed to prevent oxidation of the Ni plating layers 11$a$1 and 13$a$1, respectively, and Ag plating is continuously performed without exposing the electroless Ni plated layers to an atmosphere. With regard to the formation of the inner plating layers, the Ag plating layers may be formed by electroless Ag plating after the zincate treatment, instead of electrolytic Ag plating after the zincate treatment as described above. A Cu plating layer may be formed by electroless Cu plating after the zincate treatment. The Cu plating layer is less likely to be oxidized than the Ni plating layer so that the Ag plating layer may not be necessarily formed on the Cu plating layer.

The resin electrode layers 11$b$ and 13$b$ each contain a conductive component and a resin component. The conductive component preferably mainly contains Ag, Cu, Ni, Sn, or the like, and the resin component preferably mainly contains an epoxy resin, a phenol resin, or the like. Preferably, the resin electrode layer contains a conductive component in an amount of 67 wt % to 97 wt % and a resin component in an amount of 3 wt % to 33 wt %. More preferably, the resin electrode layer contains a conductive component in an amount of 72 wt % to 95 wt % and a resin component in an amount of 5 wt % to 28 wt %. Still more preferably, the resin electrode layer contains a conductive component in an amount of 78 wt % to 95 wt % and a resin component in an amount of 5 wt % to 22 wt %. Yet still more preferably, the resin electrode layer contains a conductive component in an amount of 79 wt % to 89 wt % and a resin component in an amount of 11 wt % to 21 wt %.

Preferably, the resin electrode layer is a printed resin electrode layer formed by screen printing of an electrode paste. Here, more preferably, the electrode paste is a Ag electrode paste containing a resin and a Ag filler containing Ag as a conductive component, and the resin electrode layer is a Ag printed resin electrode layer formed by screen printing. When the resin electrode layer is a printed resin electrode layer, the external electrode can be made flat, as compared to the case where the resin electrode is formed by dipping. In other words, screen printing results in improved thickness uniformity of the first external electrode and the second external electrode.

When the flatness of each of the first external electrode and the second external electrode is measured in a cross section as shown in FIG. 2, the variation in thickness of the first external electrode measured from the first end surface of the resin molded body and the variation in thickness of the second external electrode measured from the second end surface of the resin molded body preferably do not exceed 10 μm. More preferably, the variation in thickness does not exceed 8 μm. Still more preferably, the variation in thickness does not exceed 5 μm.

When the resin electrode layer is a printed resin electrode layer formed by screen printing of an electrode paste, the electrode paste preferably contains a conductive component in an amount of 60 wt % to 95 wt % and a resin component in an amount of 3 wt % to 30 wt %. More preferably, the electrode paste contains a conductive component in an amount of 65 wt % to 90 wt % and a resin component in an amount of 5 wt % to 25 wt %. Still more preferably, the electrode paste contains a conductive component in an amount of 70 wt % to 90 wt % and a resin component in an amount of 5 wt % to 20 wt %. Yet still more preferably, the electrode paste contains a conductive component in an amount of 75 wt % to 85 wt % and a resin component in an amount of 10 wt % to 20 wt %.

The electrode paste may contain an organic solvent, and the organic solvent is preferably a glycol ether-based solvent. Examples include diethylene glycol monobutyl ether and diethylene glycol monophenyl ether.

The electrode paste may also contain an additive in an amount of less than 5 wt %, if necessary. The additive is effective in adjusting the rheology, especially thixotropy, of the electrode paste.

The Ni plating layers 11$c$1 and 13$c$1 of the outer plating layers 11$c$ and 13$c$, respectively, are formed mainly to improve moisture resistance. The Sn plating layers 11$c$2 and 13$c$2 are formed mainly to improve solderability.

The first external electrode 11 includes a first top wrapped portion 11$b$2 where the first external electrode 11 extends to the top 9$d$ of the resin molded body 9, and a first bottom wrapped portion 11$b$3 where the first external electrode 11 extends to the bottom 9$c$ of the resin molded body 9.

The second external electrode 13 includes a second top wrapped portion 13$b$2 where the second external electrode 13 extends to the top 9$d$ of the resin molded body 9, and the second external electrode 13 includes a second bottom wrapped portion 13$b$3 where the second external electrode 13 extends to the bottom 9$c$ of the resin molded body 9.

The dimensions of the first top wrapped portion 11$b$2, the second top wrapped portion 13$b$2, the first bottom wrapped portion 11$b$3, and the second bottom wrapped portion 13$b$3 are suitably adjustable by screen printing conditions.

During formation of an external electrode of the electrolytic capacitor described later, the dimensions of the first top wrapped portion 11$b$2 (the second top wrapped portion 13$b$2) and the first bottom wrapped portion 11$b$3 (the second bottom wrapped portion 13$b$3) can be changed when screen printing a Ag electrode paste as the electrode paste on the first end surface (second end surface) of the resin molded body, by printing in a direction either from the bottom to the top or from the top to the bottom of the first end surface (second end surface).

Printing is preferably performed in a direction from the bottom to the top of the first end surface in order to increase the dimensions of the first bottom wrapped portion 11$b$3 and the second bottom wrapped portion 13$b$3 greater than the dimensions of the first top wrapped portion 11$b$2 and second top wrapped portion 13$b$2. The printing direction may be the width direction (W direction) of the resin molded body, and the first top wrapped portion 11$b$2 and the second top wrapped portion 13$b$2 may have about the same dimensions as those of the first bottom wrapped portion 11$b$3 and the second bottom wrapped portion 13$b$3.

In the electrolytic capacitor of the present invention, the resin molded body preferably includes, on its bottom, a third external electrode electrically connected to the first external electrode and a fourth external electrode electrically connected to the second external electrode.

In the electrolytic capacitor 1 shown in FIG. 1 and FIG. 2, the third external electrode 15 is formed on the bottom 9$c$ of the resin molded body 9 and is electrically connected to the first external electrode 11, and the fourth external electrode 17 is formed on the bottom 9c of the resin molded body 9 and is electrically connected to the second external electrode 13.

The third external electrode 15 includes a Cu patterned electrode layer 15a which is a metal patterned electrode layer on the bottom 9c of the resin molded body 9. The third external electrode 15 further includes a Au plating layer 15b which is a metal plating layer on the Cu patterned electrode layer 15a. Although not shown, a Ni plating layer may be formed between the Cu patterned electrode layer 15a and the Au plating layer 15b.

The fourth external electrode 17 includes a Cu patterned electrode layer 17a which is a metal patterned electrode layer on the bottom 9c of the resin molded body 9. The fourth external electrode 17 further includes a Au plating layer 17b which is a metal plating layer on the Cu patterned electrode layer 17a.

The Cu patterned electrode layers 15a and 17a each can be formed in a desired shape by forming a Cu layer on the support substrate 9g in advance and etching the Cu layer.

The Au plating layers 15b and 17b are formed to prevent oxidation of the Cu patterned electrode layers 15a and 17a, respectively.

The thickness of the metal patterned electrode layer is preferably 10 μm to 25 μm (representative value: 15 μm).

The thickness of the Au plating layer is preferably 20 nm to 50 nm (representative value: 30 nm). The thickness of the Ni plating layer is preferably 2 μm to 5 μm (representative value: 3 μm).

A Ni plating layer and a Sn plating layer are further formed on the Au plating layers 15b and 17b. The Ni plating layer and the Sn plating layer are formed to be continuous with the outer plating layer 11c of the first external electrode 11 and the outer plating layer 13c of the second external electrode 13, respectively The Ni plating layer and the Sn plating layer on the Au plating layers 15b and 17b define part of the third external electrode 15 and the fourth external electrode 17, respectively.

Preferably, the third external electrode is longer than the first top wrapped portion where the first external electrode extends to the top of the resin molded body, and the fourth external electrode is longer than the second top wrapped portion where the second external electrode extends to the top of the resin molded body.

Preferably, the third external electrode is thicker than the first top wrapped portion where the first external electrode extends to the top of the resin molded body, and the fourth external electrode is thicker than the second top wrapped portion where the second external electrode extends to the top of the resin molded body.

These relationships are described below with reference to the drawings.

Figure 5:
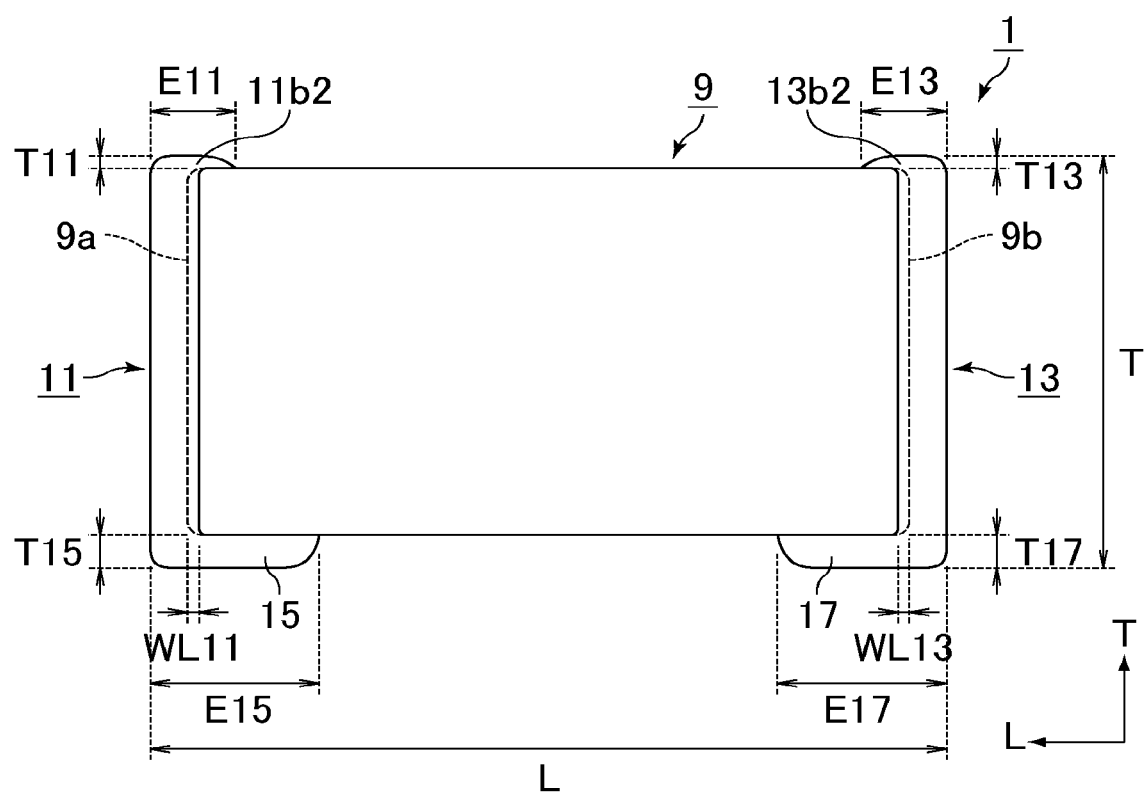
FIG. 5 is a schematic lateral view of a dimensional relationship on an LT plane of the electrolytic capacitor.

FIG. 5 is a schematic lateral view of a dimensional relationship on the LT plane of the electrolytic capacitor. FIG. 5 only shows the resin molded body 9, the first external electrode 11, the second external electrode 13, the third external electrode 15, and the fourth external electrode 17 of the electrolytic capacitor 1.

In FIG. 5, the length of the third external electrode 15 is indicated by a double-headed arrow E15, and the length of the first top wrapped portion of the first external electrode 11 is indicated by a double-headed arrow E11. The thickness of the third external electrode 15 is indicated by a double-headed arrow T15, and the thickness of the first top wrapped portion of the first external electrode 11 is indicated by a double-headed arrow T11.

The length of the fourth external electrode 17 is indicated by a double-headed arrow E17, and the length of the second top wrapped portion of the second external electrode 13 is indicated by a double-headed arrow E13. The thickness of the fourth external electrode 17 is indicated by a double-headed arrow T17, and the thickness of the second top wrapped portion of the second external electrode 13 is indicated by a double-headed arrow T13.

In this case, E15>E11, E17>E13, T15>T11, and T17>T13.

The third external electrode 15 and the fourth external electrode 17 are relatively long or thick, so that they can be suitably used as electrodes for mounting an electrolytic capacitor.

In contrast, the top wrapped portions of the first external electrode 11 and the second external electrode 13 do not serve as electrodes for mounting. Thus, these portions can be made thin to decrease the thickness of the electrolytic capacitor. The allowable dimensions (allowable thickness) of an electrolytic capacitor as a chip component are fixed. Thus, making the top wrapped portions thin can make the stack portion thick in a relative manner, enabling an increase in the capacity of the capacitor.

In FIG. 5, the length of the electrolytic capacitor 1 is indicated by a double-headed arrow L and the thickness thereof is indicated by a double-headed arrow T. The length dimensions of lateral side wrapped portions of the first external electrode 11 and the second external electrode 13 are indicated by double-headed arrows WL11 and WL13, respectively.

Figure 6:
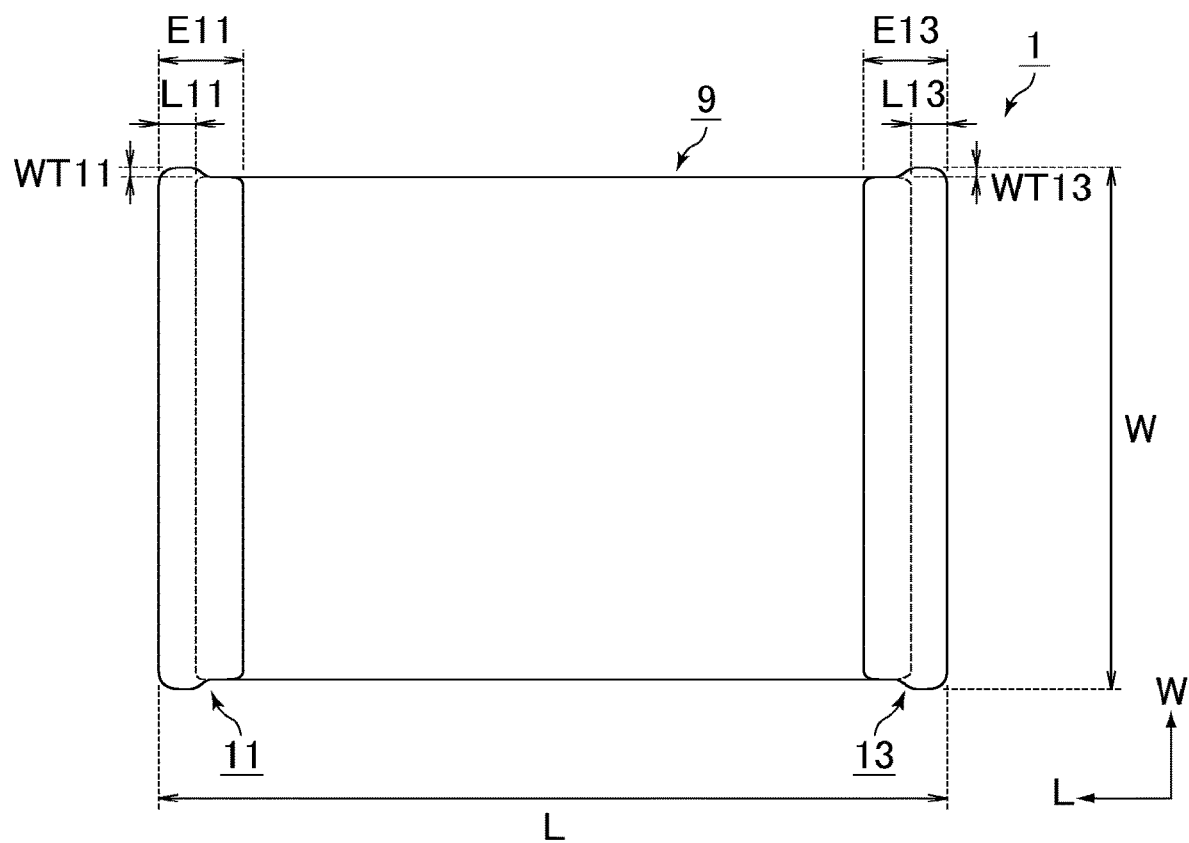
FIG. 6 is a schematic top view of a dimensional relationship on an LW plane of the electrolytic capacitor.

FIG. 6 is a schematic top view of a dimensional relationship on the LW plane of the electrolytic capacitor. FIG. 6 is a top view of the electrolytic capacitor 1. Thus, FIG. 6 shows the first external electrode 11 and the second external electrode 13, and also shows the top wrapped portions of the first external electrode 11 and the second external electrode 13. FIG. 6 indicates the width of the electrolytic capacitor 1 by a double-headed arrow W, in addition to the dimensions shown in FIG. 5. Further, the thickness dimensions of the lateral side wrapped portions of the first external electrode 11 and the second external electrode 13 are indicated by the double-headed arrows WT11 and WT13, respectively, and the thicknesses of the first external electrode 11 and the second external electrode 13 on the first end surface and the second end surface are indicated by the double-headed arrows L11 and L13, respectively.

Figure 7:
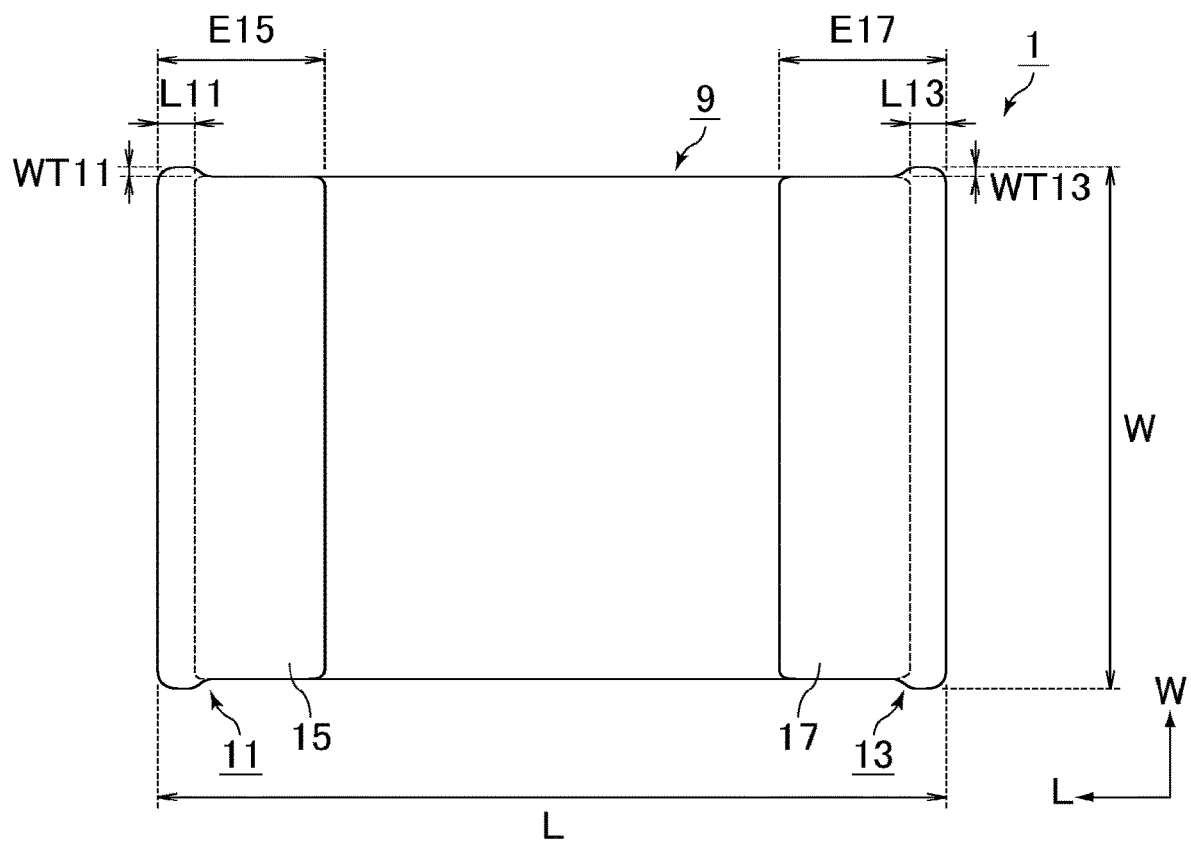
FIG. 7 is a schematic bottom view of a dimensional relationship on an LW plane of the electrolytic capacitor.

FIG. 7 is a schematic bottom view of a dimensional relationship on the LW plane of the electrolytic capacitor. FIG. 7 is a bottom view of the electrolytic capacitor 1. Thus, FIG. 7 shows the third external electrode 15 and the fourth external electrode 17.

A comparison between FIG. 6 and FIG. 7 shows that the double-headed arrow Ely indicating the length of the third external electrode 15 and the double-headed arrow E11 indicating the length of the fourth external electrode 17 are longer than E11 indicating the length of the top wrapped portion of the first external electrode 11 and E13 indicating the length of the top wrapped portion the second external electrode 13 shown in FIG. 6, respectively. In other words, the external electrodes on the bottom of the electrolytic capacitor have larger areas, and are thus suitable for mounting an electrolytic capacitor.

Figure 8:
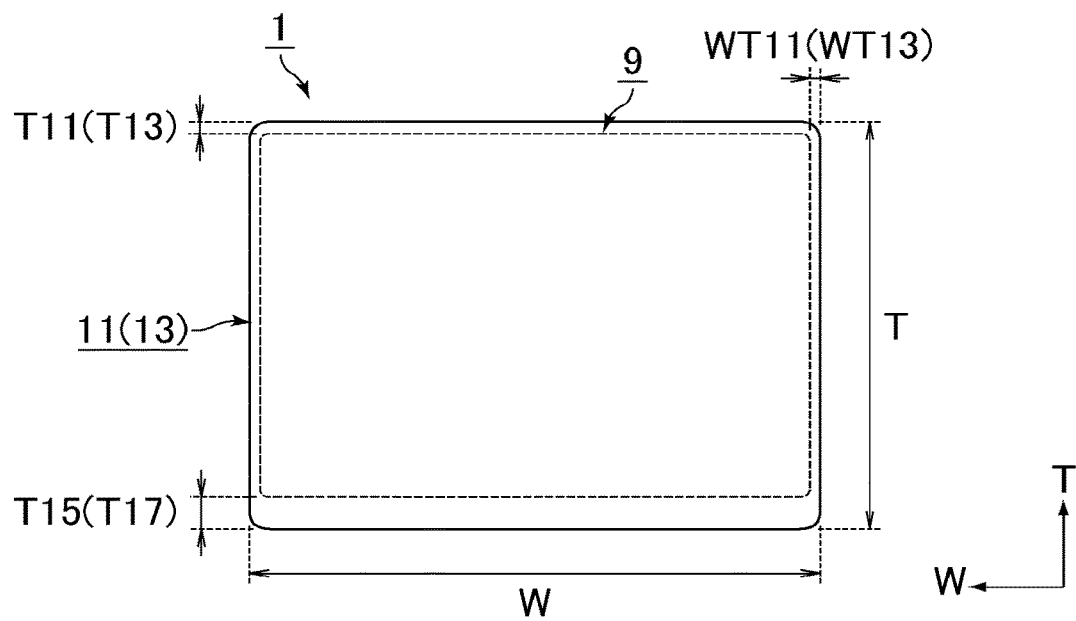
FIG. 8 is a schematic lateral view (end view) of a dimensional relationship on a WT plane of the electrolytic capacitor.

FIG. 8 is a schematic lateral view (end view) of a dimensional relationship on the WT plane of the electrolytic capacitor. FIG. 8 shows the electrolytic capacitor 1 seen from the first end surface side. The view is the same when the electrolytic capacitor 1 is seen from the second end surface side. FIG. 8 shows that the double-headed arrows T15 indicating the thickness of the third external electrode 15 and T17 indicating the thickness of the fourth external electrode 17 are thicker than T11 indicating the thickness of the top wrapped portion of the first external electrode 11 and T13 indicating the thickness of the top wrapped portion of the second external electrode 13, respectively.

Examples of preferred ranges of dimensions shown in the figures are as described below.

Dimensions of electrolytic capacitor:
Dimension of L: 3.4 mm to 3.8 mm; representative value: 3.5 mm
Dimension of W: 2.7 mm to 3.0 mm; representative value: 2.8 mm
Dimension of T: 1.8 mm to 2.0 mm; representative value: 1.9 mm
Dimensions of external electrode
Dimensions of L11 and L13 (thickness dimensions the first and second external electrodes on the end surfaces): 0.005 mm to 0.06 mm; representative value: 0.02 mm
Dimensions of E11 and E13 (length dimensions of the top wrapped portions): 0.005 mm to 0.15 mm; representative value: 0.1 mm
Dimensions of E15 and E17 (length dimensions of the third and fourth external electrodes): 0.3 mm to 0.7 mm; representative value: 0.5 mm
Dimensions of WT11 and WT13 (thickness dimensions of the lateral side wrapped portions of the first and second external electrodes): 0.005 mm to 0.02 mm, representative value: 0.01 mm
Dimensions of WL11 and WL13 (length dimensions of the lateral side wrapped portions of the first and second external electrodes): 0.01 mm to 0.15 mm; representative value: 0.05 mm
Dimensions of T11 and T13 (thickness dimensions of the top wrapped portions): 0.002 mm to 0.015 mm; representative value: 0.005 mm
Dimensions of T15 and T17 (thickness dimensions of the third and fourth external electrodes): 0.01 mm to 0.15 mm; representative value: 0.05 mm Preferably, in a lateral view of the electrolytic capacitor, the first external electrode and the third external electrode form an L shape, and the second external electrode and the fourth external electrode form an L shape. This is apparent from the shapes of the external electrodes shown in FIG. 5.

The first external electrode 11 and the third external electrode 15 form an L shape by being formed on the first end surface 9a and the bottom 9c of the resin molded body 9, respectively. The second external electrode 13 and the fourth external electrode 17 form an L shape by being formed on the second end surface 9b and the bottom 9c of the resin molded body 9, respectively.

That the external electrodes each have an L shape means that the external electrodes are mainly formed on the end surfaces and the bottom of the resin molded body 9. As shown in FIG. 5 and elsewhere, the external electrodes may extend to the top wrapped portion and the lateral side wrapped portion in addition to the end surfaces and the bottom of the resin molded body 9. The configuration in such a case is also considered to be an L shape.

While the top wrapped portions of the first external electrode and the second external electrode are short, the third external electrode and the fourth external electrode are long. Thus, the external electrodes appear to form an L shape as a whole.

The lateral side wrapped portions of the first external electrode and the second external electrode are short, and thus these portions do not affect the determination whether or not the configuration is an L shape.

The electrolytic capacitor of the first embodiment of the present invention that has been described so far can be produced by the following method, for example.

Production of Capacitor Element

A valve-action metal foil such as aluminum foil including a porous layer such as an etched layer on the surface is provided, and a dielectric layer is formed on the surface of the porous layer by anode oxidation.

A solid electrolyte layer is formed on the dielectric layer by screen printing, and subsequently, a carbon layer is formed on the solid electrolyte layer by screen printing. Further, a cathode lead-out layer is formed on the carbon layer by sheet lamination or screen printing.

A capacitor element can be obtained by the above steps.

Stacking of Capacitor Elements and Enclosing in Resin

Multiple capacitor elements are formed into a stack, and the stack is enclosed in a sealing resin by a compression mold to produce a resin molded body.

The stack is preferably produced on a support substrate, and the support substrate preferably includes, on its backside, metal patterned electrode layers that define part of the third external electrode and fourth external electrode.

An Au plating layer is preferably disposed on each metal patterned electrode layer.

The resin molded body having a configuration shown in FIG. 3 and FIG. 4 in which the anode portions and the cathode portions are exposed can be produced by the production method disclosed in JP 2019-79866 A.

The method of producing the resin molded body includes preparing a first sheet, preparing a second sheet, coating the first sheet with an insulating material, forming a conductor layer on the first sheet, producing a multilayer sheet, producing a multilayer block body by enclosing the multilayer sheet in a sealing resin, and producing multiple resin molded bodies by cutting the multilayer block body.

The first sheet includes a valve-action metal substrate including a dielectric layer on the surface and a solid electrolyte layer on the dielectric layer. The second sheet is metal foil.

The first sheet and the second sheet each have through-holes at a portion corresponding to the first end surface or the second end surface of the resin molded body, and these through-holes are connected to each other when the sheets are formed into a multilayer sheet. Then, these through-holes are filled with a sealing resin when the multilayer sheet is enclosed in a sealing resin, whereby a multilayer block body is produced. The multilayer block body is cut such that sealing resin filling the through-holes is divided, whereby a resin molded body can be obtained.

In this resin molded body, the anode is divided by the sealing resin filling the through-holes into multiple anode portions, and the multiple anode portions are exposed. Additionally, the cathode is divided by the sealing resin filling the through-holes into multiple cathode portions, and the multiple cathode portions are exposed.

Formation of External Electrode

An Ag electrode paste as the electrode paste is screen printed on the first end surface of the resin molded body, and the Ag electrode paste is then thermally cured to form a first external electrode. Here, the first external electrode is electrically connected to the metal patterned electrode layer as the third external electrode disposed on the bottom of the resin molded body.

In addition, the Ag electrode paste is screen printed on the second end surface of the resin molded body, and the Ag electrode paste is then thermally cured to form a second external electrode. Here, the second external electrode is electrically connected to the metal patterned electrode layer as the fourth external electrode disposed on the bottom of the resin molded body.

The Ag electrode paste contains a conductive component and a resin component, and a resin electrode layer thus formed is a printed resin electrode layer. Preferably, the electrode paste for use in this step contains a conductive component in an amount of 60 wt % to 95 wt % and a resin component in an amount of 3 wt % to 30 wt %. More preferably, the electrode paste contains a conductive component in an amount of 65 wt % to 90 wt % and a resin component in an amount of 5 wt % to 25 wt %. Still more preferably, the electrode paste contains a conductive component in an amount of 70 wt % to 90 wt % and a resin component in an amount of 5 wt % to 20 wt %. Yet still more preferably, the electrode paste contains a conductive component in an amount of 75 wt % to 85 wt % and a resin component in an amount of 10 wt % to 20 wt %.

The electrode paste may contain an organic solvent, and the organic solvent is preferably a glycol ether-based solvent. Examples include diethylene glycol monobutyl ether and diethylene glycol monophenyl ether. The electrode paste may also contain an additive in an amount of less than 5 wt %, if necessary.

Preferably, the zincate treatment and displacement plating are performed before screen printing of the Ag electrode paste so as to form a Ni plating layer as an inner plating layer.

Preferably, a Ag plating layer is further formed as an inner plating layer on the Ni plating layer.

Preferably, a Ni plating layer and a Sn plating layer are formed as outer plating layers. The outer plating layers are formed on the printed resin electrode layers as the first external electrode and the second external electrodes and also on the third external electrode and the fourth external electrode.

The electrolytic capacitor of the present invention can be obtained by the above steps.

The following describes another embodiment of the electrolytic capacitor of the present invention. The electrolytic capacitor according to this embodiment is referred to as an electrolytic capacitor of the second embodiment.

The electrolytic capacitor of the second embodiment has the same configuration as that of the electrolytic capacitor of the first embodiment, except that the third external electrode and the fourth external electrode each include a resin electrode layer containing a conductive component and a resin component, instead of the metal patterned electrode layer and the Au plating layer.

Figure 9:
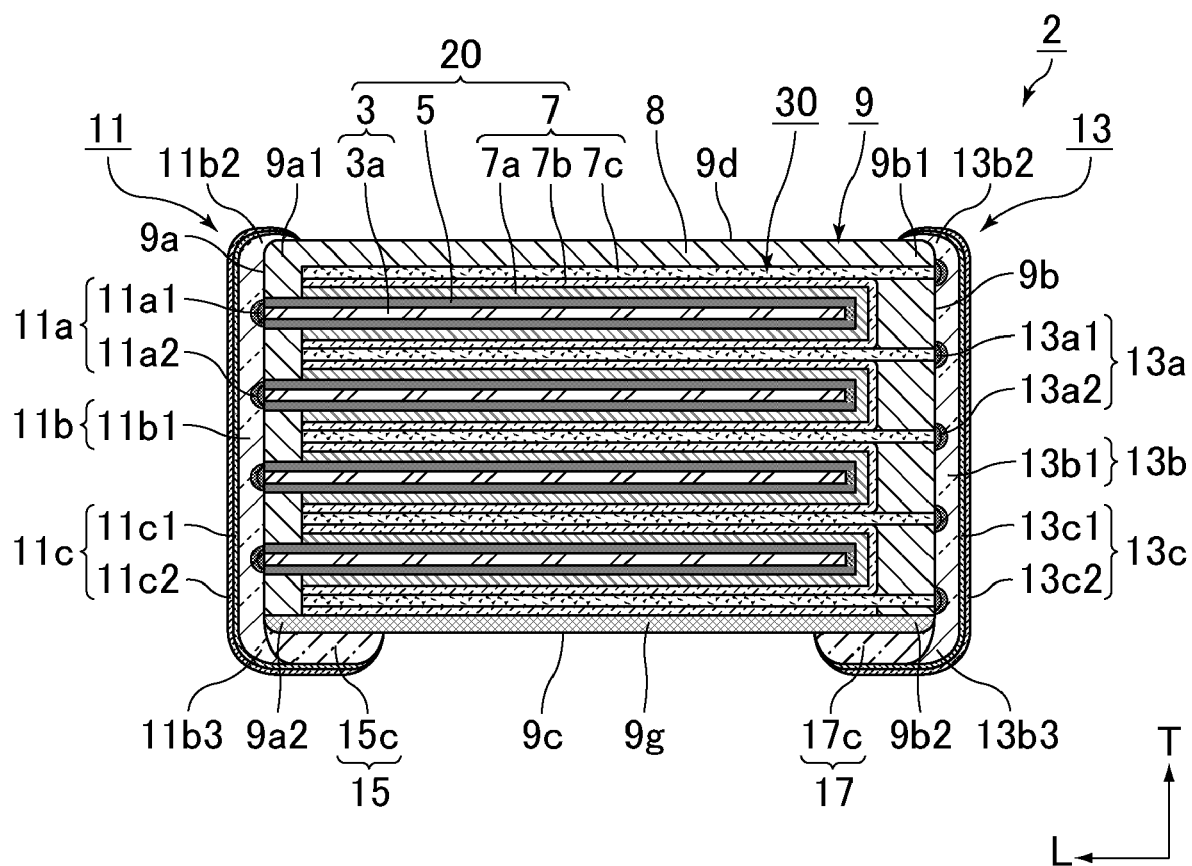
FIG. 9 is a schematic cross-sectional view of an example of an electrolytic capacitor of a second embodiment.

FIG. 9 is a schematic cross-sectional view of an example of the electrolytic capacitor of the second embodiment.

An electrolytic capacitor 2 shown in FIG. 9 includes a resin electrode layer 15c as the third external electrode 15. The electrolytic capacitor 2 also includes a resin electrode layer 17c as the fourth external electrode 17.

A Ni plating layer and a Sn plating layer are further formed on the resin electrode layers 15c and 17c. The Ni plating layer and the Sn plating layer are formed to be continuous with the outer plating layer 11c of the first external electrode 11 and the outer plating layer 13c of the second external electrode 13, respectively. The Ni plating layer and the Sn plating layer on the resin electrode layers 15c and 17c define part of the third external electrode 15 and the fourth external electrode 17, respectively.

Configurations of components other than the third external electrode and fourth external electrode are the same as those of the electrolytic capacitor 1 shown in FIG. 2. Thus, detailed descriptions of those configurations are omitted.

The resin electrode layer preferably contains a conductive component and a resin component as in the resin electrode layers 11b and 13b defining the first external electrode 11 and the second external electrode 13, respectively. Preferably, the resin electrode layer contains a conductive component in an amount of 67 wt % to 97 wt % and a resin component in an amount of 3 wt % to 33 wt %.

Preferably, the resin electrode layer defining the third external electrode and the resin electrode layer defining the fourth external electrode are printed resin electrode layers formed by screen printing of an electrode paste on the bottom of the resin molded body.

More preferably, the resin electrode layers are Ag printed resin electrode layers formed by screen printing of a Ag electrode paste containing Ag as a conductive component.

When the resin electrode layer is a printed resin electrode layer formed by screen printing of an electrode paste on the bottom of the resin molded body, the electrode paste preferably contains a conductive component in an amount of 60 wt % to 95 wt % and a resin component in an amount of 3 wt % to 30 wt %.

Preferably, the third external electrode and the fourth external electrode each sequentially include a printed resin electrode layer formed by screen printing on a bottom of the resin molded body, a Ni plating layer, and a Sn plating layer.

The thickness of the printed resin electrode layer is preferably 5 μm or more, more preferably 150 μm or less, still more preferably 100 μm or less.

The following describes a method of producing the electrolytic capacitor of the second embodiment of the present invention.

This method uses a support substrate without a metal patterned electrode layer on its backside, and the steps up to stacking of the capacitor elements and enclosing in a resin can be performed in the same manner as in the method of producing the electrolytic capacitor of the first embodiment.

To form external electrodes, a Ag electrode paste as the electrode paste is screen printed on the first end surface and the second end surface of the resin molded body. Then, the Ag electrode paste is thermally cured to form a first external electrode and a second external electrode. Also, the Ag electrode paste as the electrode paste is screen printed on the bottom of the resin molded body and is then thermally cured to simultaneously form a third external electrode and a fourth external electrode as printed resin electrode layers.

The third external electrode and the fourth external electrode may be simultaneously formed on the bottom of the resin molded body after the first external electrode and the second external electrode are respectively formed on the first end surface and the second end surface of the resin molded body as described above. Alternatively, the steps may be reversed. Specifically, the third external electrode and the fourth external electrode may be simultaneously formed on the bottom of the molded body, and then the first external electrode and the second external electrode may be respectively formed on the first end surface and the second end surface of the resin molded body.

Preferably, the electrode paste for use in this step contains a conductive component in an amount of 60 wt % to 95 wt % and a resin component in an amount of 3 wt % to 30 wt %. More preferably, the electrode paste contains a conductive component in an amount of 65 wt % to 90 wt % and a resin component in an amount of 5 wt % to 25 wt %. Still more preferably, the electrode paste contains a conductive component in an amount of 70 wt % to 90 wt % and a resin component in an amount of 5 wt % to 20 wt %. Yet still more preferably, the electrode paste contains a conductive component in an amount of 75 wt % to 85 wt % and a resin component in an amount of 10 wt % to 20 wt %.

The electrode paste may contain an organic solvent, and the organic solvent is preferably a glycol ether-based solvent. Examples include diethylene glycol monobutyl ether and diethylene glycol monophenyl ether. The electrode paste may also contain an additive in an amount of less than 5 wt %, if necessary.

Preferably, a Ni plating layer and a Sn plating layer are formed as outer plating layers. The outer plating layers are formed on the printed resin electrode layers as the first external electrode and the second external electrode, and are also formed on the printed resin electrode layers as the third external electrode and the fourth external electrode.

The electrolytic capacitor of the second embodiment of the present invention can be obtained by the above steps. The electrolytic capacitor of the second embodiment does not include a metal patterned electrode layer on the backside of the support substrate. This configuration does not require arrangement of multiple electrolytic capacitors, for example, in the printing direction from the bottom to the top, before screen printing to form a resin electrode layer on each of the first end surface and the second end surface of the resin molded body. Further, when the electrolytic capacitor has a configuration that does not require a support substrate, there is no need to distinguish between the top and the bottom. Thus, such a configuration does not require arrangement of multiple electrolytic capacitors to be aligned in the printing direction.

The electrolytic capacitor according to each embodiment of the present invention described above is a solid electrolytic capacitor including a solid electrolyte layer. Yet, the electrolytic capacitor may be an electrolytic capacitor in which an electrolytic solution is used, instead of a solid electrolyte, or may be an electrolytic capacitor in which a solid electrolyte and an electrolytic solution are both used.

The stack including the capacitor elements preferably includes multiple capacitor elements but may include only one capacitor element.

EXAMPLES

The following shows examples of the electrolytic capacitor of the present invention in which thickness uniformity and adhesion of the external electrodes were evaluated. The present invention is not limited to these examples.

The thickness uniformity, adhesion, and ESR of the external electrodes were evaluated by the following procedures.

Table 1 shows compositions of Ag electrode pastes indicated with composition No. 1 to No. 8. In each composition No., the left column shows the ratio of components in 100 wt % of the Ag electrode paste, and the right column shows the ratio of components in 100 wt % of the printed electrode layer as a solid content excluding the organic solvent.

The stack having a configuration shown in FIG. 1 and FIG. 2 was enclosed in a sealing resin containing an epoxy resin and silica particles to obtain a resin molded body. Subsequently, inner plated layers were formed, and the Ag electrode paste was applied to the end surfaces (the first end surface and the second end surface) of the resin molded body by screen printing, and was thermally cured at a drying temperature of 150° C. to 200° C. The Ag electrode paste was also applied to the bottom of the resin molded body by screen printing, and was thermally cured at a drying temperature of 150° C. to 200° C. Subsequently, outer plated layers were formed, whereby a first external electrode, a second external electrode, a third external electrode, and a fourth external electrode were formed.

To evaluate the thickness uniformity, the thickness of each of the first external electrode and the second external electrode (see the double-headed arrows L11 and L13 in FIG. 6 and FIG. 7) formed using the Ag electrode pastes having compositions shown in Table 1 was measured at five sites, and standard deviations σ were calculated. The results were evaluated as shown in Table 1. "A" indicates a variation not exceeding 5 µm; "B" indicates a variation not exceeding 8 µm; and "C" indicates a variation not exceeding 10 µm.

To evaluate the adhesion, solder cream was printed on electrodes on a measurement substrate, and the third external electrode and the fourth external electrode of the electrolytic capacitor were placed on the electrodes. The electrolytic capacitor was solder-mounted to the substrate in a reflow furnace at 260° C. Load was applied to the LT plane of the electrolytic capacitor in the W direction, and the electrolytic capacitor was observed to determine whether or not there was damage to the external appearance and the external electrodes were cut or peeled. The results were evaluated as shown in Table 1. "A" indicates "more preferred"; "B" indicates "preferred"; and "C" indicates "no practical problems".

To evaluate ESR as electrical characteristics, measuring terminals were connected to the first external electrode and the second external electrode formed using the Ag electrode pastes having compositions shown in Table 1 to measure ESR (mΩ)) at 100 kHz using an LCR meter. The results were evaluated as shown in Table 1. "A" indicates 30 mΩ or less; "B" indicates 35 mΩ or less, and "C" indicates 40 mΩ or less.

TABLE 1

| Component | Composition | No. 1 | | No. 2 | | No. 3 | | No. 4 | | No. 5 | | No. 6 | | No. 7 | | No. 8 | |
|---|---|---|---|---|---|---|---|---|---|---|---|---|---|---|---|---|---|
| Conductive component | Ag powder | 60 | 67 | 65 | 72 | 70 | 78 | 75 | 79 | 80 | 84 | 85 | 89 | 90 | 95 | 95 | 97 |
| Resin component | Epoxy resin/ phenol resin | 30 | 33 | 25 | 28 | 20 | 22 | 20 | 21 | 15 | 16 | 10 | 11 | 5 | 5 | 3 | 3 |
| Organic solvent | Diethylene glycol monobutyl ether | 10 | | 10 | | 10 | | 5 | | 5 | | 5 | | — | | — | |
| | Diethylene glycol monophenyl ether | — | | — | | — | | — | | — | | — | | 5 | | 2 | |
| | Thickness uniformity | C | | B | | B | | A | | A | | A | | B | | C | |
| | Adhesion | A | | A | | A | | A | | A | | A | | B | | C | |
| | ESR (mΩ) | C | 40 | C | 37 | B | 33 | A | 30 | A | 29 | A | 28 | A | 27 | A | 25 |

As shown in Table 1, the resin electrode layers each containing a conductive component and a resin component exhibited high adhesion with the resin molded body. Adhesion at least at a level without practical problems was exhibited in all the examples.

In addition, the formation of the resin electrode layers by screen printing of the electrode paste resulted in the external electrodes each having high thickness uniformity.

Further, the ESR of the resin electrode layers were reduced by using the electrical characteristics inherent to the resin electrode layers each having a high conductive component content.

In addition, favorable evaluations and more favorable evaluations of the thickness uniformity, adhesion, and ESR were achieved by adjusting the proportions of the conductive component and the resin component in the conductive paste.

REFERENCE SIGNS LIST 1, 2 electrolytic capacitor
3 anode
3a valve-action metal foil
3A, 3B, 3C, 3D anode portion
5 dielectric layer
7 cathode
7a solid electrolyte layer
7b conductive layer
7c cathode lead-out layer
7A, 7B, 7C, 7D cathode portion
8 sealing resin
9 resin molded body
9a first end surface
9a1, 9b1 top corner portion
9a2, 9b2 bottom corner portion
9b second end surface
9c bottom of resin molded body
9d top of resin molded body
9e first lateral surface
9f second lateral surface
9g support substrate
11 first external electrode
11a, 13a inner plating layer
11a1, 13a1 Ni plating layer
11a2, 13a2 Ag plating layer
11b, 13b resin electrode layer
11b1, 13b1 Ag printed resin electrode layer
11b2 first top wrapped portion
11b3 first bottom wrapped portion
11c, 13c outer plating layer
11c1, 13c1 Ni plating layer
11c2, 13c2 Sn plating layer
13 second external electrode
13b2 second top wrapped portion
13b3 second bottom wrapped portion
15 third external electrode
15a, 17a Cu patterned electrode layer
15b, 17b Au plating layer
17 fourth external electrode
20 capacitor element
30 stack

The invention claimed is:

1. A method of producing an electrolytic capacitor, the method comprising:
preparing a resin molded body having opposed first and second end surfaces, the resin molded body including a stack that includes a capacitor element with an anode exposed at the first end surface, a dielectric layer on a surface of the anode, and a cathode opposite to the anode and exposed at the second end surface, and a sealing resin that encloses the stack;
screen printing an electrode paste on at least one of the first end surface and the second end surface simultaneously with wrapping the electrode paste on at least one of a bottom surface and a top surface of the resin molded body;
thermally curing the electrode paste at a temperature of 150° C. to 200° C. on: (1) the first end surface and at least one of the bottom surface and the top surface to form an integrally connected first external electrode on the first end surface and the at least one of the bottom surface and the top surface, and/or (2) the second end surface and at least one of the bottom surface and the top surface to form an integrally connected second external electrode on the second end surface and the at least one of the bottom surface and the top surface.

* * * * *